(12) United States Patent
Forman et al.

(10) Patent No.: US 6,523,325 B1
(45) Date of Patent: Feb. 25, 2003

(54) APPARATUS FOR MAKING RESEALABLE PACKAGES AND RECLOSABLE SEALS

(75) Inventors: Harold M Forman, Pennsburg, PA (US); Trevor G Smith, Phoenixville, PA (US)

(73) Assignee: SealStrip Corporation, Boyertown, PA (US)

( * ) Notice: Subject to any disclaimer, the term of this patent is extended or adjusted under 35 U.S.C. 154(b) by 0 days.

(21) Appl. No.: 10/020,236

(22) Filed: Dec. 18, 2001

Related U.S. Application Data (60) Division of application No. 09/693,963, filed on Oct. 23, 2000, now Pat. No. 6,371,644, and a continuation-in-part of application No. 09/364,180, filed on Jul. 29, 1999, now Pat. No. 6,350,057.

(51) Int. Cl.[7] ............................. B65B 61/20; B31B 1/90
(52) U.S. Cl. ....................... 53/133.4; 53/139.2; 53/551; 493/212; 493/213; 493/214; 493/927
(58) Field of Search ............................ 53/133.3, 133.4, 53/139.2, 550, 551; 493/927, 297, 210, 212, 213, 214

(56) References Cited

U.S. PATENT DOCUMENTS

| | | | | | |
|---|---|---|---|---|---|
| 4,106,261 A | * | 8/1978 | Greenawalt | ................... | 53/450 |
| 4,604,854 A | * | 8/1986 | Andreas | ........................ | 53/552 |
| 4,618,383 A | * | 10/1986 | Herrington | ................... | 383/63 |
| 4,741,789 A | * | 5/1988 | Zieke et al. | ................... | 383/63 |
| 4,898,280 A | * | 2/1990 | Runge | ........................ | 383/200 |
| 5,058,761 A | * | 10/1991 | Williams | ...................... | 383/63 |
| 5,403,094 A | * | 4/1995 | Tomic | .......................... | 383/63 |
| 5,447,772 A | * | 9/1995 | Flieger | ........................ | 383/200 |
| 5,944,425 A | * | 8/1999 | Forman | ........................ | 383/63 |
| 6,132,089 A | * | 10/2000 | Galomb et al. | ................ | 383/63 |
| 6,350,057 B1 | * | 2/2002 | Forman | ........................ | 383/63 |
| 6,393,804 B1 | * | 5/2002 | Ausnit | ........................ | 493/213 |

* cited by examiner

*Primary Examiner*—John Sipos
*Assistant Examiner*—Louis Huynh
(74) *Attorney, Agent, or Firm*—Walter B. Udell (57) ABSTRACT

Apparatus for making packages having improved openable and reclosable interlocking seals from a continuous web of composite packaging film, the seal having male and female portions of arrowhead shape in cross section, snap detents, and being formed transversely to the direction of film flow during package formation at line speed. The packaging film is provided at package length intervals with thermoformable strips secured thereto transversely to the running length of the film, and is fed to a modified standard vertical form, fill and seal packaging machine where the film is formed into a bag with the thermoformable strip inside in ends abutting folded facing relationship at the upper end of the bag, product deposited into the bag, the bag sealed, the reclosable interlocking seal formed, and the bag severed from the next bag being formed. The package reclosable seal provides positive auditory and tactile indications of the closing of the reclosable seal so that the consumer is assured that the package has been resealed even in the absence of visual package inspection. The form-fill apparatus is provided with a novel bottom press for effecting the the package sealing and reclosable seal formation, and a novel fill tube forming collar oriented within a particular angular range for feeding the composite film to the packaging machine,

13 Claims, 12 Drawing Sheets

APPARATUS FOR MAKING RESEALABLE PACKAGES AND RECLOSABLE SEALS

This application is a continuation in part of application Ser. No. 09/364,180 filed on Jul. 29, 1999 now U.S. Pat. No. 6,350,057 and is a divisional of application Ser. No. 09/693,963 filed on Oct. 23, 2000 now U.S. Pat. No. 6,371,644.

This invention relates generally to packaging systems, and more particularly to apparatus for making flexible packages of the kind shown in my copending earlier application having an openable and reclosable interlocking seal which may be further provided with a center hinge and lateral side snap detents spaced along the length of the seal, the reclosable interlocking seal having male and female parts with the detents being formed in the female part and extending into the male part. The seal structure provides tactile and auditory snap indications of the state of the seal during opening and closing of the package. The apparatus for making such packages utilize a continuous web of composite film moving at line speed.

BACKGROUND OF THE INVENTION

In the past, the apparatus for making reclosable flexible packages have usually involved either the extrusion of a two part zipper type locking structure along with the film extending longitudinally in the direction of film extrusion along the opposite edges of the film, or by heat sealing a separately made extruded zipper type locking structure to the package film. The first type of package formation results in packages having the reclosable feature in the consumer non-preferred position along the long edge of the package, while the second type of package formation results in packages which are expensive to make because of the need to inventory and store rolls of the separate zipper structure for attachment to the packaging film and the need to insure that the separately obtained packaging film and zipper are made of compatible materials. Consumer focus groups have disclosed dissatisfaction with both types of zipper structure for various reasons, such as user frustration because of difficulty in reclosing the zippers, and no feedback to the user that the zipper has in fact been engaged.

Shown and described in my earlier application is a resealable interlocking closure of the same general kind as shown and described in this application, but which does not utilize the film and strip technology of the present invention, and does not include the improved features of the present invention.

SUMMARY OF THE INVENTION

The package and system according to the present invention utilize a novel composite packaging film structure comprising the packaging film with strips of formable plastic laminated to the film at package length intervals. The composite packaging film structure may be preformed and stored as roll stock material or may be concurrently made by a Sig Pack, Inc. Easy Snap™ Laminator mounted atop or adjacent to the packaging apparatus to form the novel composite packaging film structure, which composite film is then fed into the packaging apparatus to form the finished package incorporating the novel reclosable seal formed in the film and strip composite. The laminator functions with both horizontal and vertical form/fill/seal wrapping machines and with overwrap packagers, and laminates various plastic strip materials to diverse heat seal packaging films.

The packaging films could be for example, polypropylene, polyethylene, polystyrene, polyvinylchloride, thermoplastic heat seal coated non-plastic films, and various film laminations of two to four layers, while the plastic strip could be formed of one to three layers. In some applications the strip could be a single thickness of polyvinylchloride (PVC) heat sealed to a PVC film at a temperature of about 230° F. for ½ to ¾ seconds, while in other applications the strip could be of two layers such as PVC plus a sealing layer, or three layers such as a center layer coated on opposite sides respectively with a sealing layer and a release layer to prevent the strip from self adhering during formation of the reclosable interlock seal. A commonly used packaging film is a four layer film consisting of two layers of polypropylene separated by a layer of low density polyethylene and having a heat seal layer of low density polyethylene coated on one face.

The invention is shown and described in conjunction with a modified vertical form, fill and seal packaging machine having a novel fill tube forming collar and novel package sealing press which latter also forms the novel resealable closure, the packaging machine being for example a Sig Pack, Inc. Eagle Infinity, Model 1524.

Packages made according to the invention incorporating the novel reclosable seal address the consumer complaints relating to prior art zipper seals by providing clear auditory and tactile indications of the closing of the reclosable seal by incorporation of snap detents, so that the consumer is assured that the package has been resealed even in the absence of visual package inspection.

Accordingly, it is a primary object of the invention to provide novel apparatus for making openable and reclosable interlocking seals for packages.

Another object of the invention is to provide novel apparatus for making packages having openable and reclosable interlocking seals.

An additional object of the invention is to provide novel apparatus for making a package having an openable and reclosable interlocking seal as aforesaid in which the bulk of the seal structure is provided by an added layer of strip material secured in a specific way to the packaging film at package length intervals.

A yet further object of the invention is to provide novel apparatus for making a package having an openable and reclosable interlocking seal as aforesaid in which the ends of the strip material are positioned in abutment at substantially the center of one face of the package to provide a hinge to assist in package opening.

Still another object of the invention is to provide novel apparatus for making a reclosable interlocking package seal having male and female parts with snap detents being formed in the parts, the closure structure providing tactile and auditory snap indications of the state of the closure during opening and closing of the package.

A yet further object of the invention is to provide novel apparatus for making packages as aforesaid in which the reclosable interlocking seal is formed from the packaging film and a heat sealable strip heat sealed to the packaging film.

A still further object of the invention is to provide novel apparatus for making packages as aforesaid in which the packages may be formed from a variety of packaging films such as polypropylene, polyethelene, polystyrene, polyvinylchloride, and various film laminates.

The foregoing and other objects of the invention will be more clearly understood from a reading of the following description in conjunction with an examination of the appended drawings, wherein:

In the several figures, like elements are denoted by like reference characters.

Figures 1, 1A:
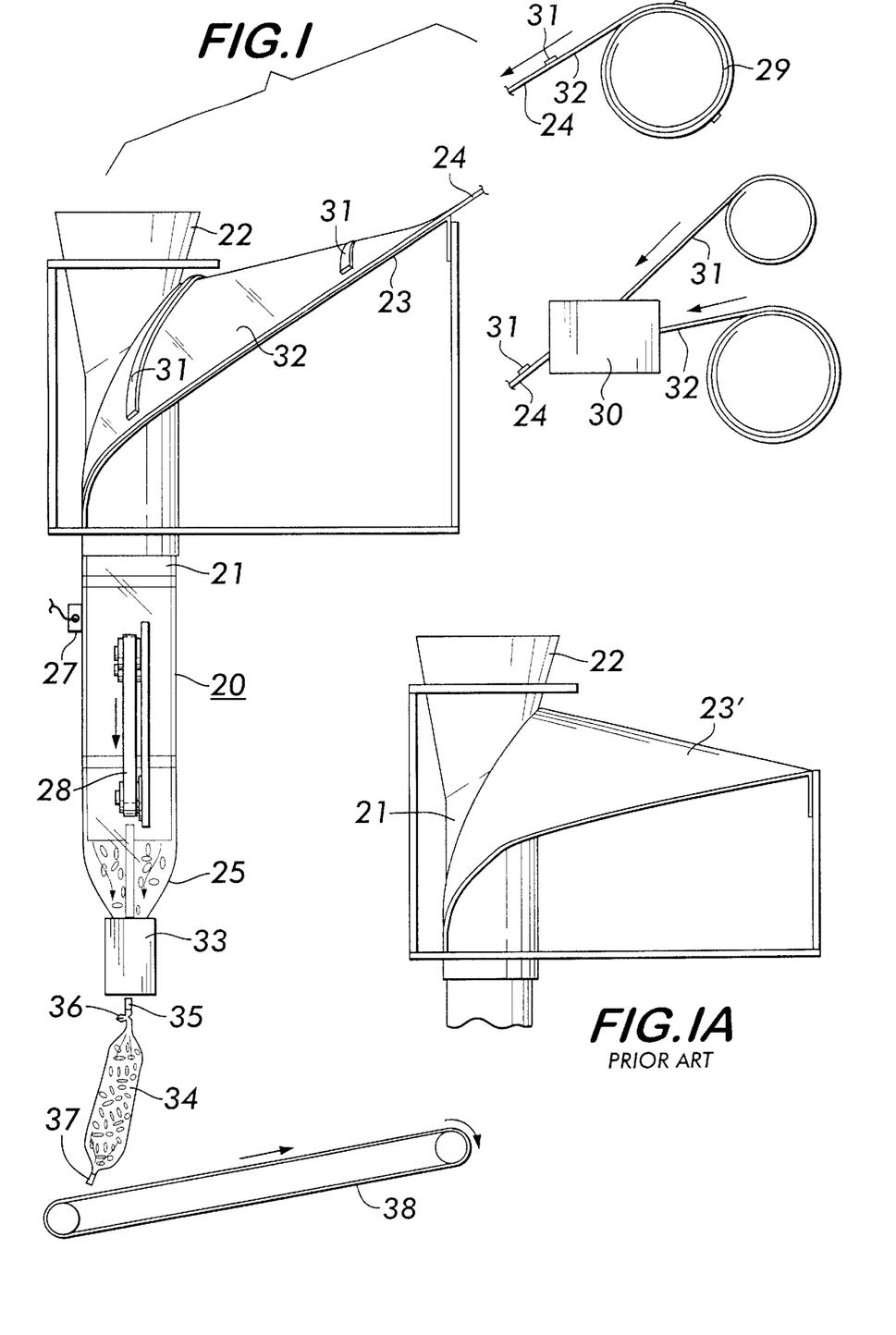
FIG. 1 is a diagrammatic side view of the apparatus according to the invention showing the method and stages of package forming, filling, sealing, and severing, and showing the novel fill tube forming collar.
FIG. 1A is a diagrammatic side view of a prior art conventional form, fill and seal packaging machine showing the standard type of fill tube forming collar.
Figure 2:
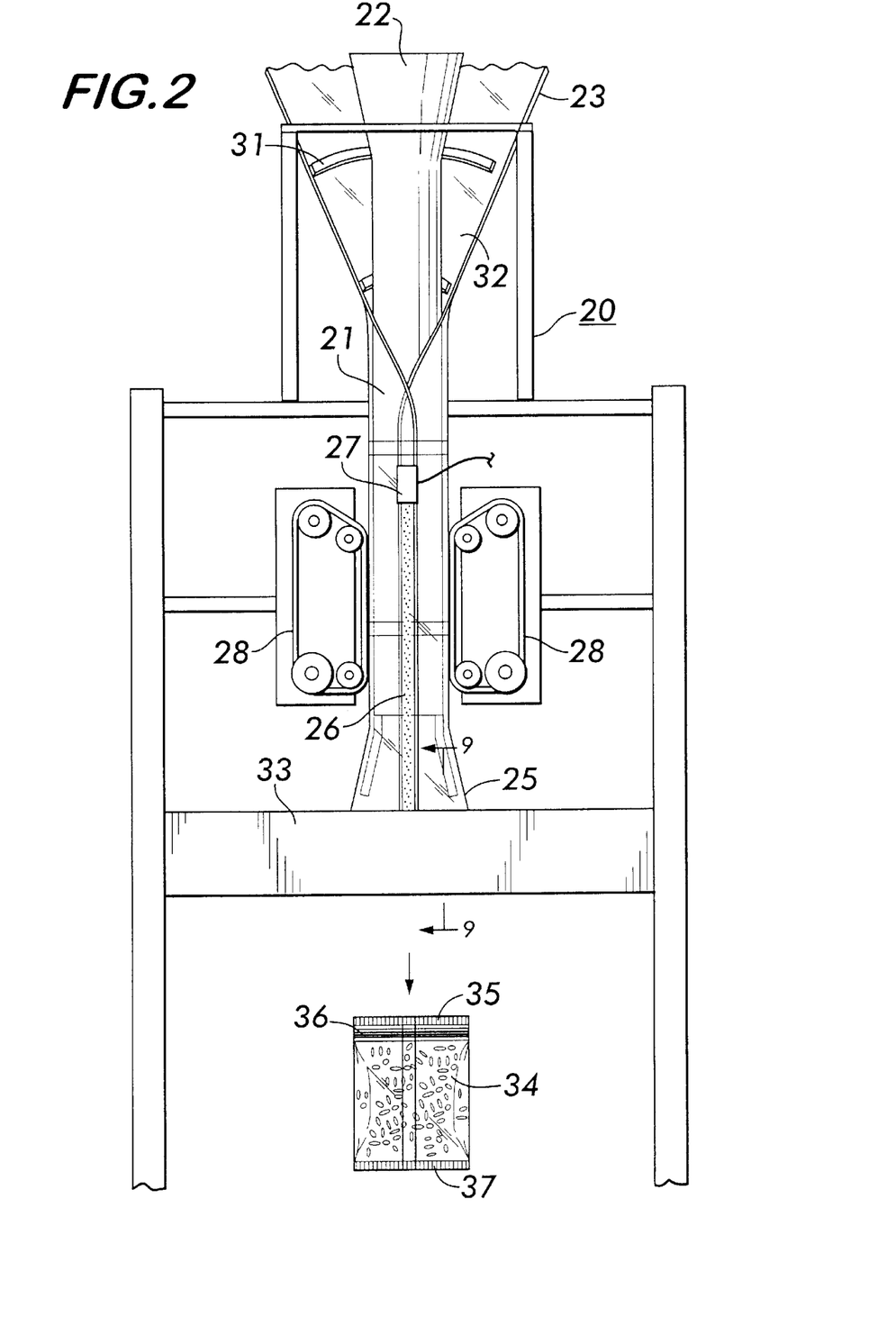
FIG. 2 is a diagrammatic front view of the apparatus seen in FIG. 1.

Considering first the side and front diagrammatic elevational views of FIGS. 1 and 2, there is seen a modified conventional vertical form-fill packaging apparatus designated generally as 20, and which could be for example a Sig Pack, Inc. Eagle Infinity, Model 1524, comprising a vertical cylindrical fill tube 21 surmounted by a conical feed horn 22 into which the material to be packaged is deposited. Disposed adjacent to the feed horn 22 at an angle of about fifteen degrees above the horizontal and turned downward around the feed horn 22 and fill tube 21 with a slight space therebetween is a fill tube forming collar 23, the purpose of which, together with the fill tube 21, is to form a composite web of packaging material 24 being fed over the forming collar 23 into a tube having a longitudinally extending seal 26 formed by the heat seal device 27. To avoid problems in reliably feeding the composite web packaging material, the angle of the fill tube forming collar is best kept to not less than horizontal but can be steeper than the fifteen degrees illustrated, although too high an elevation can cause film bunching and machinery headroom problems.

A pair of belt drives 28, by pulling downward on the tube 25, pull the web 24 downward off of the supply roll 29 or from the composite web forming apparatus 30 which laminates thermoformable strips 31 to the packaging material 32 to form the composite web of packaging material 24. The apparatus 30 may be a a Sig Pack, Inc. Easy Snapxm Laminator. The filled descending tube 25 passes through the bottom press 33 where it pauses for formation of the top seal 35 and the reclosable seal 36, severing of the completed package 34 from the above lying tube, and formation of a bottom seal 37 of the next descending package. The completed package 34 is carried away by the conveyor 38.

The apparatus of FIGS. 1 and 2 departs from conventional vertical form-fill apparatus in two particulars. First, as shown in FIG. 1A, prior art conventional apparatus has the front edge of its fill tube forming collar 23' disposed substantially orthogonally to the surface of the conical feed horn 22, and this conventional orientation causes the thermoformable strips 31 to be torn off of the web of packaging film 32. This problem was solved in the apparatus according to the invention by reorienting the forming collar 23 as shown and providing a leading edge tack to the strips 31, as will become clear from FIGS. 3 and 4 to be next described. The second difference is the inclusion of the novel bottom press 33 which forms the reclosable seal, to be subsequently described.

Figure 3:
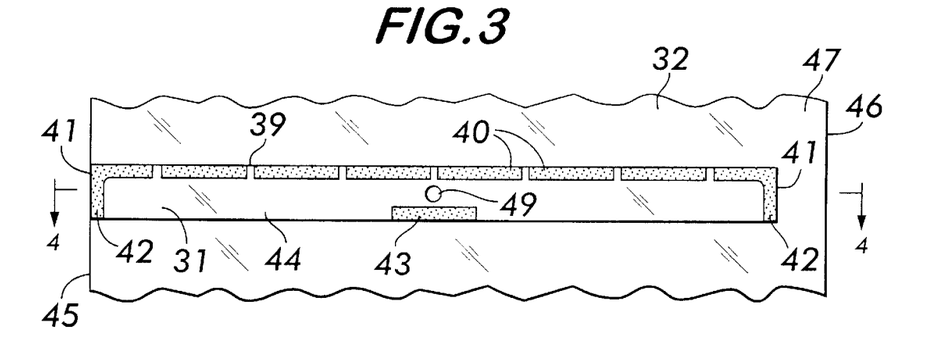
FIG. 3 is a plan view of a portion of one form of the composite film showing the packaging film and the placement of the attached strip suitable for making a package having an overlapped longitudinal seal.
Figure 4:
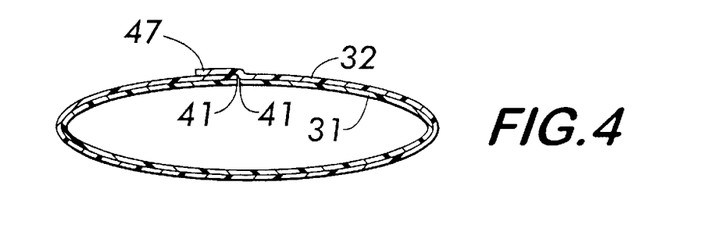
FIG. 4 is a diagrammatic cross section view through a package formed from the film of FIG. 3 having a longitudinally extending overlap seal.
Figure 5:
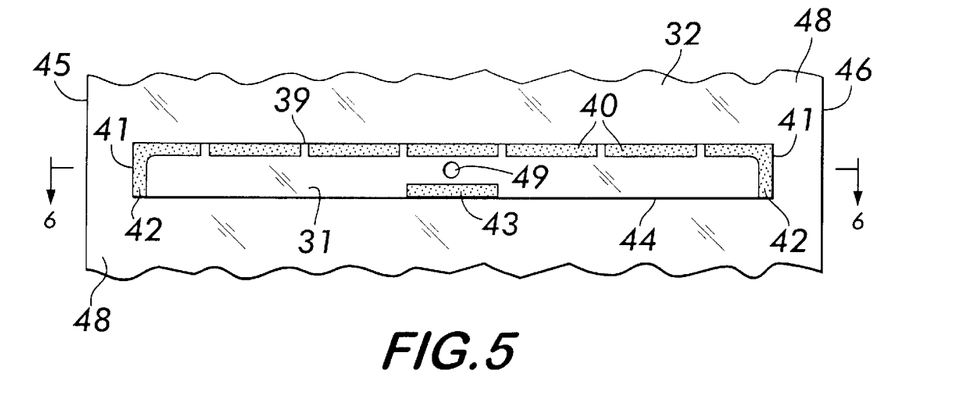
FIG. 5 is a plan view of a portion of another form of the composite film showing the packaging film and the placement of the attached strip suitable for making a package having a longitudinal fin seal.
Figure 6:
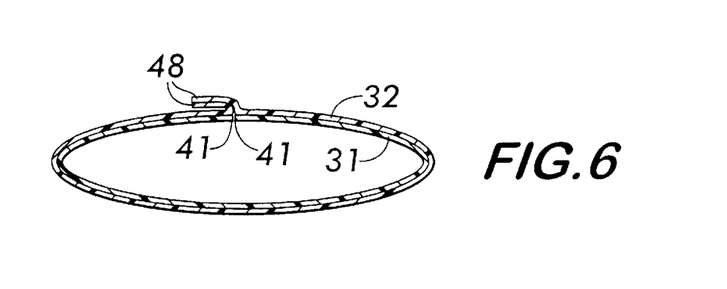
FIG. 6 is a diagrammatic cross section view through a package formed from the film of FIG. 5 having a longitudinally extending fin seal.

Considering now FIGS. 3 and 5, there is seen in both, the packaging film material 32 and a thermoformable strip 31 secured to the film 32 substantially continuously along the strip trailing edge 39 by heat seals 40, along the strip ends 41 as at 42, and by a short tack 43 at the center of the strip leading edge 44 to insure that the leading edge is against the packaging film as the composite web passes into the space between the feed horn 22 and forming collar 23 to prevent tearing off the strip from the film. The only difference between FIGS. 3 and 5 is that, in FIG. 3 one end of the strip 31 is congruent with one edge 45 of the packaging film material 32 and the other end of the strip is spaced inward from the other edge 46 of the packaging film material 32 to form a side margin 47, while in FIG. 5 both ends 41 of the strip are spaced inward from the edges 45 and 46 of the packaging film material 32 to form a pair of opposite side margins 48. The strips 31 are also provided with apertures 49 through the strips which in the completed package act as a weakened region allowing a hinge fold to occur when the package is opened. Another hinge is provided in the completed package opposite the first hinge by the substantially abutting apposed ends 41 of the strip 31, as seen in FIGS. 4 and 6. FIGS. 4 and 6 respectively show an overlap longitudinal package seal 26 as seen in FIG. 2 formed by the side margin 47 of FIG. 3, and a fin seal formed by the two side margins 48 of FIG. 5 which may be made by other vertical form-fill machines.

Figure 7:
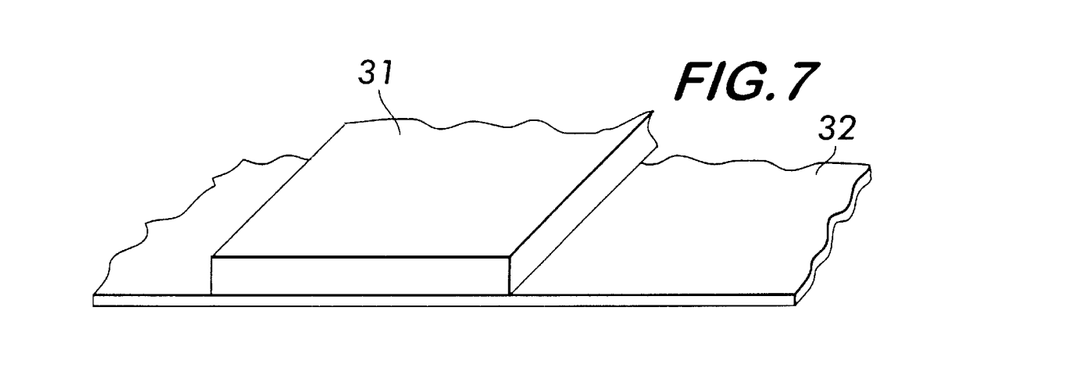
FIG. 7 is a fragmentary enlarged view of a composite packaging film composed of a single layer film and a single layer strip.
Figure 8:
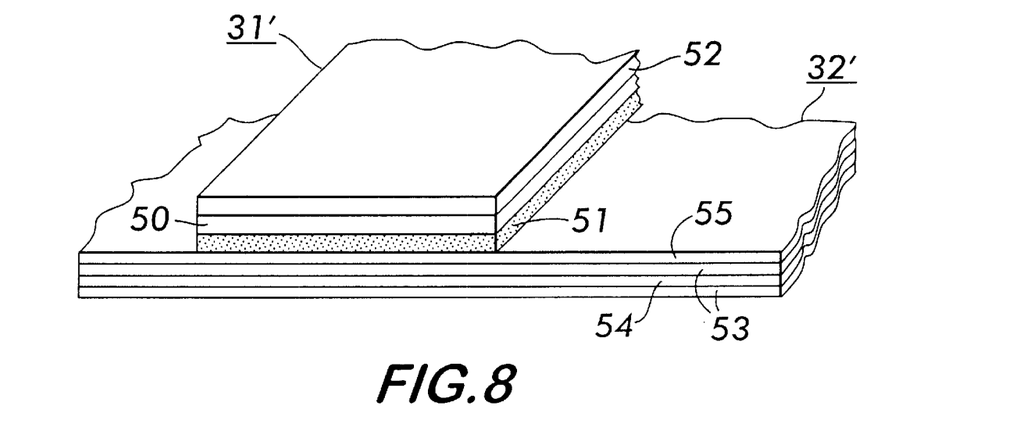
FIG. 8 is a fragmentary enlarged view of a composite packaging film composed of a multi-layer film and a multi-layer strip.

FIG. 7 illustrates a single layer strip 31 heat sealed to a single layer packaging film 32 in which typically the strip could be 3 to 15 mil polyvinylchloride and the film could be 1.5 to 4 mil polyvinylchloride. FIG. 8 illustrates a three layer strip 31' sealed to a four layer packaging film 32'. The strip 31' could typically have a thermoformable plastic center layer 50 of 3 to 15 mil thickness, a heat seal layer 51 of 0.5 to 3 mil thickness, and a release layer 52 of 3 to 50 microns thickness. The release layer is sometimes needed to prevent the engaged faces of the folded strip from fusing together when the reclosable seal is formed in the manner subsequently to be described. The commonly used four layer film 32' is composed of two layers of polypropylene 53 separated by a layer 54 of low density polyethylene and having a heat seal layer 55 of low density polyethylene. Two layer strips and two and three layer films can also be used.

Figure 9:
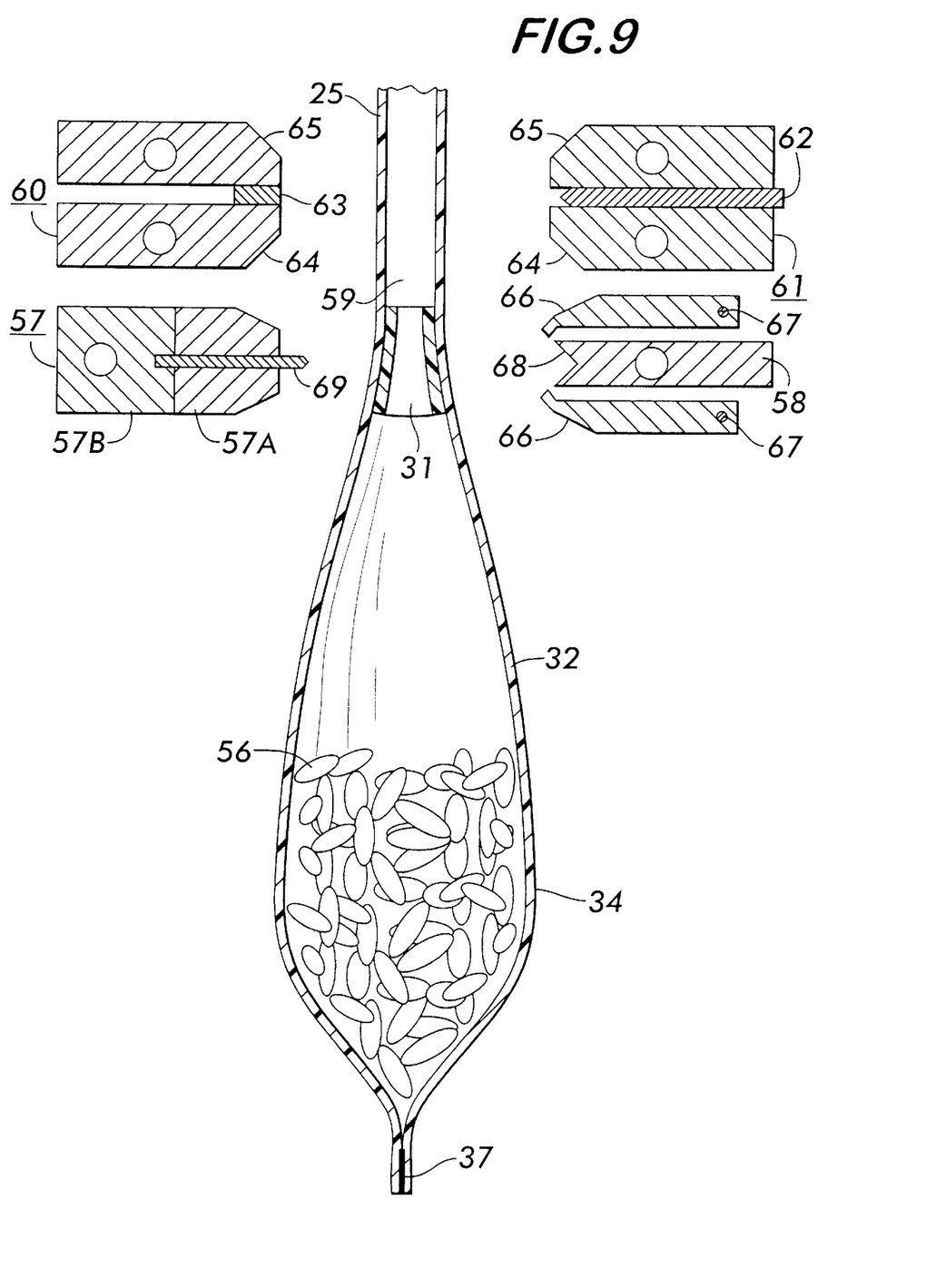
FIG. 9 is an enlarged diagrammatic cross section through a bag being sealed and severed and through the novel sealing and reclosable seal forming press, shown with the press open before the sealing and seal forming step takes place.
Figure 9A:
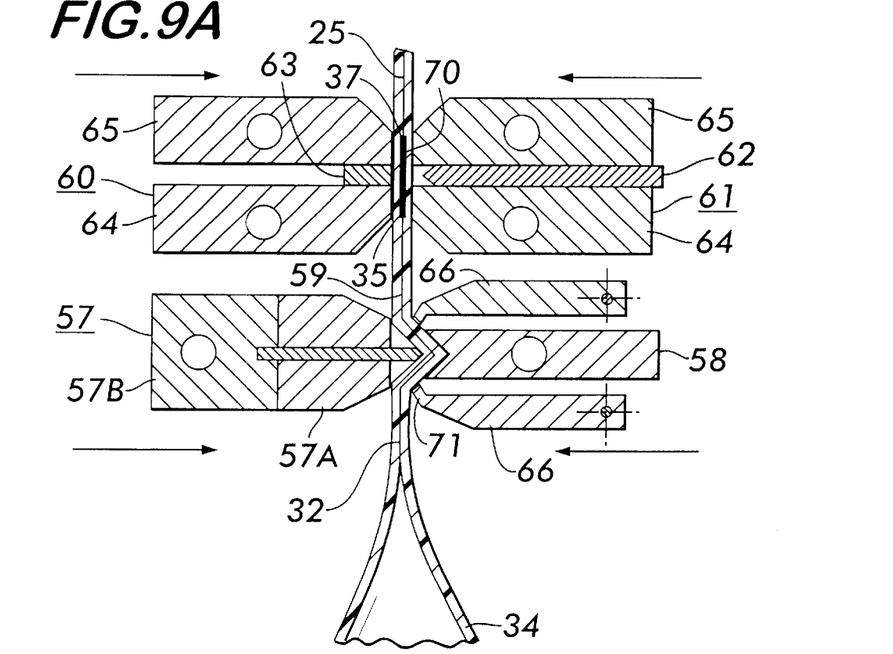
FIGS. 9A through 9C show successive steps in the ends sealing, reclosable seal forming, and package severing process.
Figure 9B:
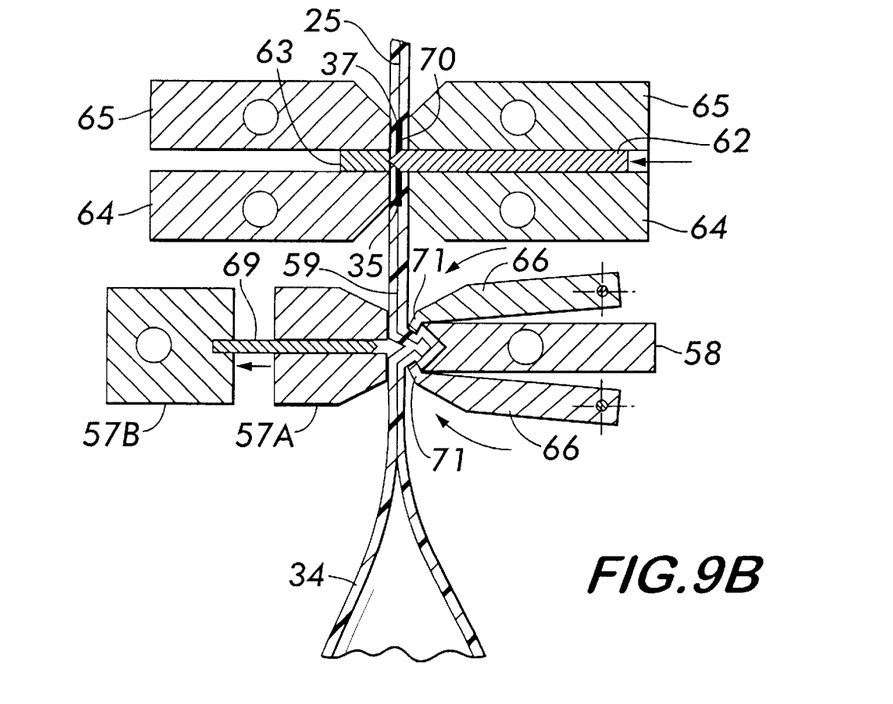
Figure 9C:
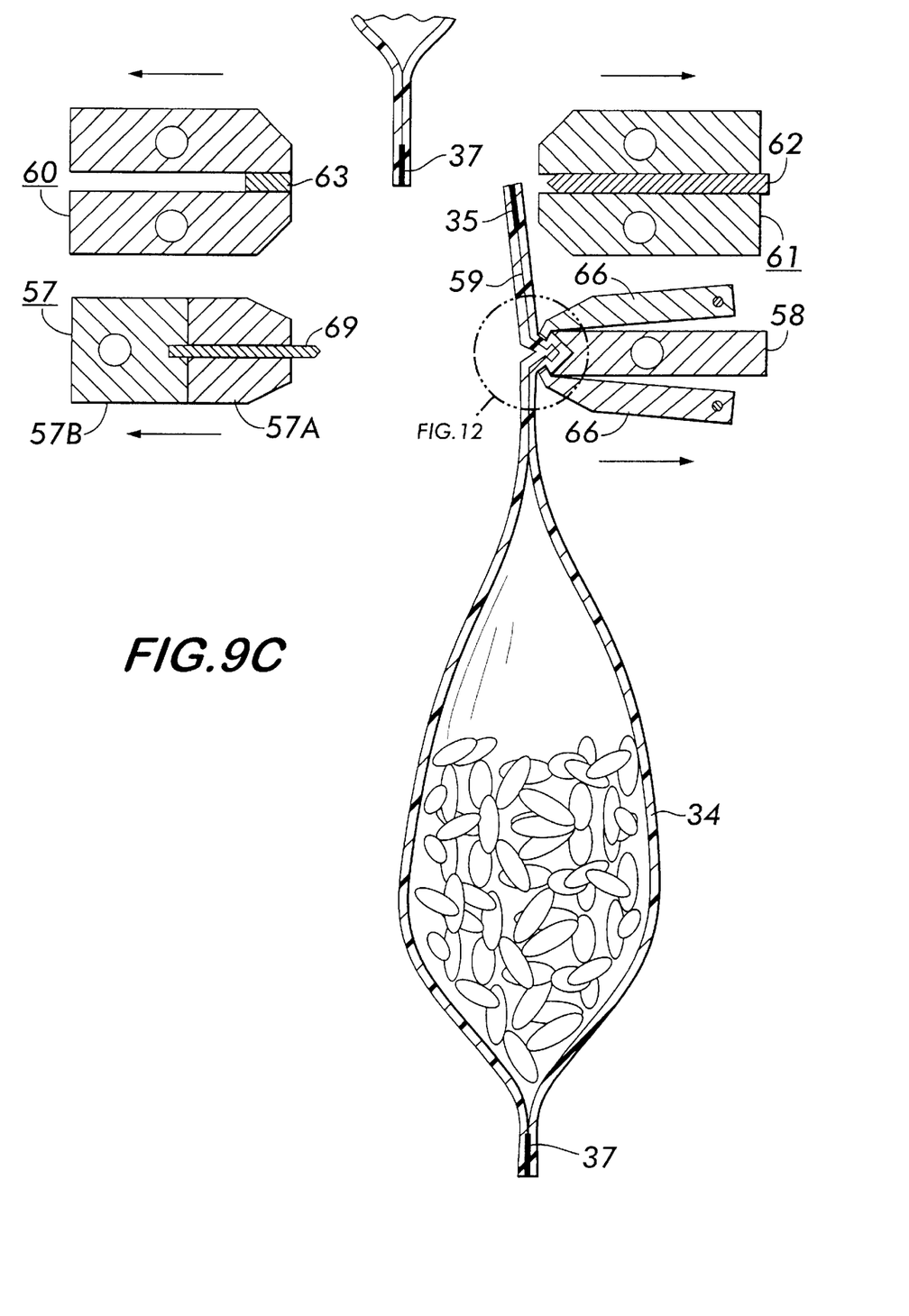

Turning now to FIGS. 9 through 9C which illustrate the formation of the package end seals and reclosable seal, there is seen in FIG. 9 a package 34 which has been filled with product 56 while descending, and has stopped at a position where the upper part of the package is within the bottom press 33 just prior to completion by the formation of the top seal and reclosable seal. The package 34 is stopped so that the thermoformable strip 31 is positioned between the reclosable seal forming horizontally reciprocable heated female die 58 and the two part heated male die 57, with an above-lying length 59 of the tube 25 positioned below the composite heated dies 60 and 61 and the package severing cutter 62 and anvil 63. The female die 58 is provided with a forming recess 68, and the male die is provided with a forming wedge 69 carried by the male die part 57B and shaped complementally to the female die recess 68. The composite dies 60 and 61 consist of a pair of dies 64 which form the top seal 35 of the package 34 being completed, and a pair of above-lying dies 65 which form the bottom seal 37 of the next package to descend. Disposed above and below the forming recess 68 of female die 58 are a pair of heated reclosable seal detent forming toothed dies 66 reciprocable with the female die 58 and pivotable toward one another on pivots 67.

FIG. 9A shows the reclosable seal forming heated dies 57 and 58 moved toward one another and into engagement, heat forming the package film 32 and thermoformable strip 31 into the recess of the female die 58 to form the point of the arrowhead shaped reclosable seal. For clarity, the strip 31 is not shown in FIGS. 9A through 9C, but its location is seen clearly from FIGS. 9 and 11 to 13. At the same time, the heated dies 60 and 61 heat seal the tube 25 entirely widthwise for a vertical interval 70 and define the unsecured interval 59 between the bottom of the top seal 35 and the top of the reclosable seal 36, the portion of the seal 70 heated by the dies 64 becoming the package top seal 35, and the portion of the seal 70 heated by the dies 65 becoming the bottom seal 37 of the next descending package when the seal 70 is subsequently severed widthwise by the cutter 62.

The next step is a hybrid between FIGS. 9A and 9B in which the conditions are as shown in FIG. 9A except that the detent forming dies 66 have pivoted inward and closed sufficiently to begin formation of the inwardly sloping bottom surfaces 72 of the arrowhead shaped interlock, but not sufficiently to clamp the male die forming wedge 69.

FIG. 9B shows the immediately following condition in which the cutter 62 has moved laterally to sever the heat seal 70 against the anvil 63 and separate the package 34 from the above-lying tube 25. At the same time, male die part 57B carrying the wedge 69 partially retracts from the recess 68 of female die 58 and from between the teeth 71 of the dies 66, and the dies 66 pivot further inward driving the detent forming die teeth 71 toward one another to their maximum closed position, the teeth 71 pinching the packaging film 32 and thermoformable strip 31 therebetween to form the film and strip into the female die recess to continue forming the inwardly sloping bottom surfaces 72 of the arrowhead shaped reclosable seal 36, and forming the snap detents 73 best seen in FIGS. 11 and 13. The female die 58 is then moved somewhat left toward the dies 66 to set the arrowhead shape between itself and the facing surfaces of teeth 71 of detent forming dies 66. The detents 73 are formed because as the softened thermoformable material of the film and strip are compressed between the teeth 71 the only direction that the compressed material can move is laterally into the spaces between the teeth 71, and then bulge outward between the teeth, forming the detents 73.

FIG. 9C shows the male and female dies 57 and 58 outwardly retracted with the female die laterally carrying the package 34 held within it by the unopened detent forming dies 66, and the package end seal dies 60 and 61 and the cutter 62 have been retracted. The dies 66 remain engaged for a short time to complete setting of the detents, after which they open and release the completed package which drops to the conveyor 38 as shown in FIG. 1, and the sequence commencing with FIG. 9 is repeated. Sequencing and timing controls and drives for the sequential movements of the various dies is provided by standard commercially available components.

Figure 9D:
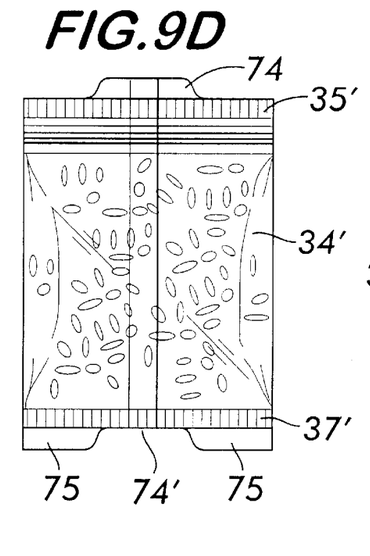
FIGS. 9D and 9E show two views of an alternative form of package having a top pull-open tab usable with a package top end seal formed with a thermoformable bond which can be pulled apart.
Figure 9E:
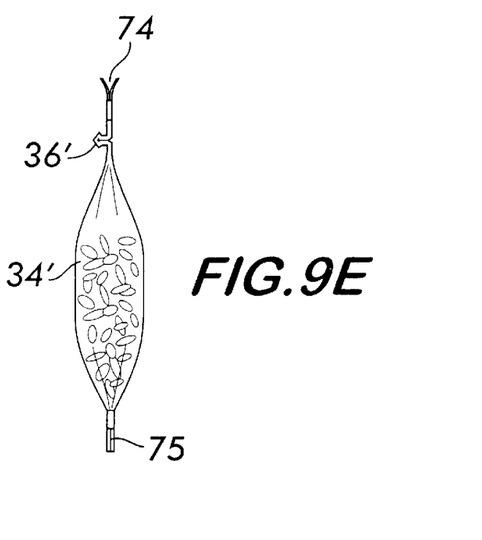

A variation 34' of the package 34 is shown in FIGS. 9D and 9E in which it is seen that a flap or tab 74 extends centrally above the top heat seal 35', and that a cut-out 74' corresponding in shape to the tab 74 is located just below the bottom heat seal 37', with flanking flaps or tabs 75 disposed at both sides of the cut-out 74'. This configuration is readily achievable by vertically upwardly shifting the heat seal die 65 to provide an interval between it and the die 64, and configuring the cutter 62 to provide the cut-out pattern for the tabs 74 and 75. While this uses more package film, if a pull-apart heat seal material is provided at 35', the unsecured parts of the tab 74 can be grasped and used to pull open the top of the package.

Figure 10:
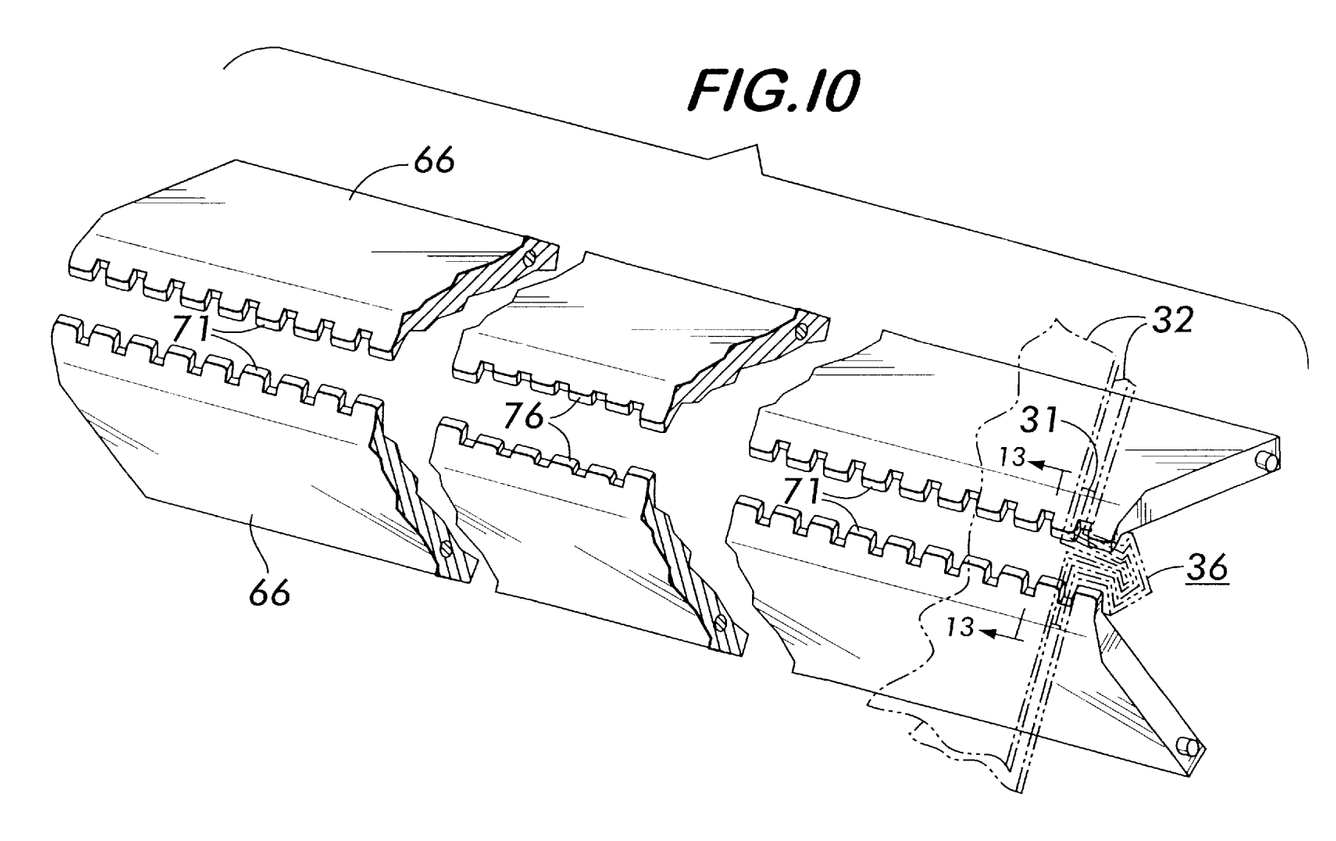
FIG. 10 is an isometric view showing the forming dies which form the snap detents in the reclosable interlocking seal, with the reclosable seal shown in phantom outline.
Figure 11:
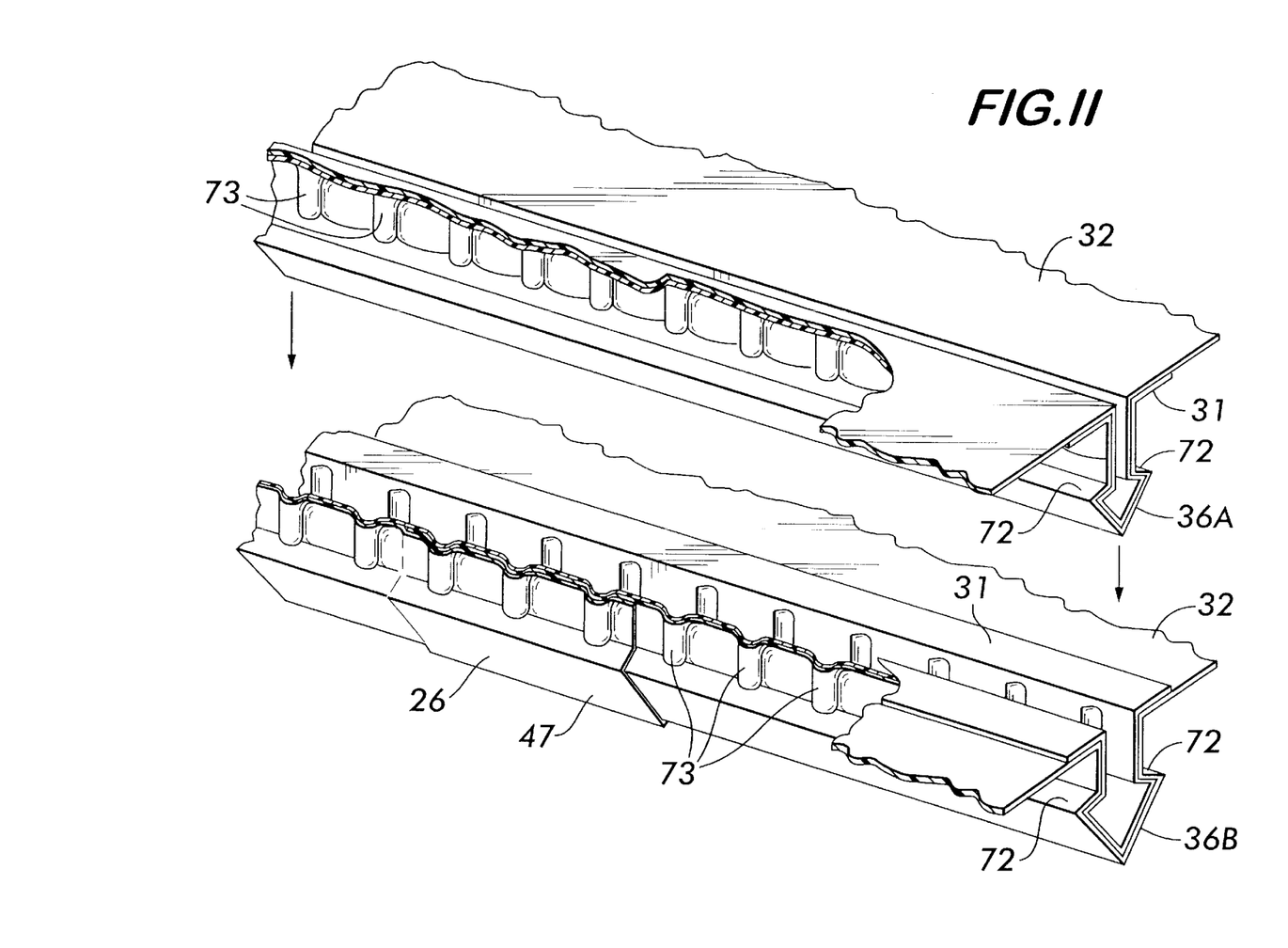
FIG. 11 is an enlarged fragmentary isometric view of the inner and outer parts of the reclosable seal in separated position, showing the snap detents in the sidewalls of the seal adjacent to the arrowhead interlock.
Figure 12:
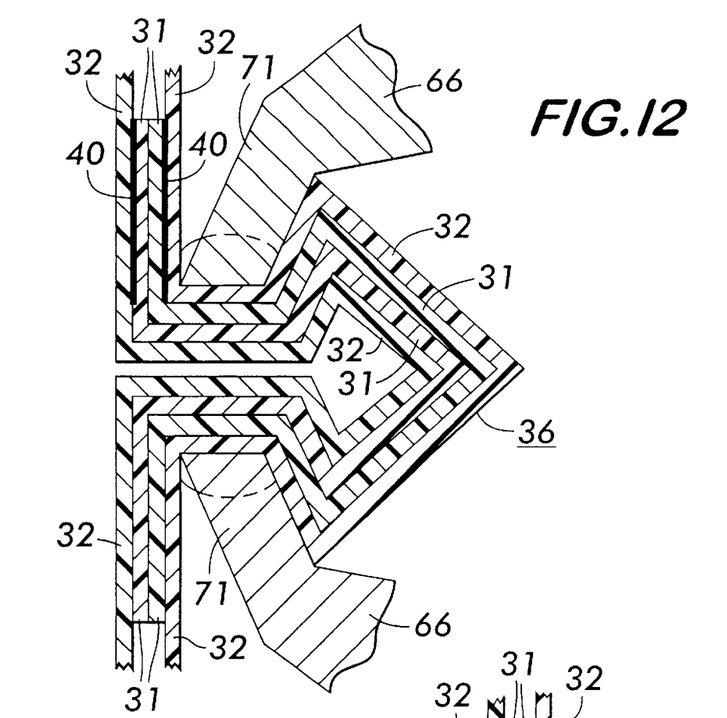
FIG. 12 is an enlarged cross section through the reclosable seal shown in the phantom circle on FIG. 9C showing the placement of the forming dies of FIG. 10 and between the snap detents.
Figure 13:
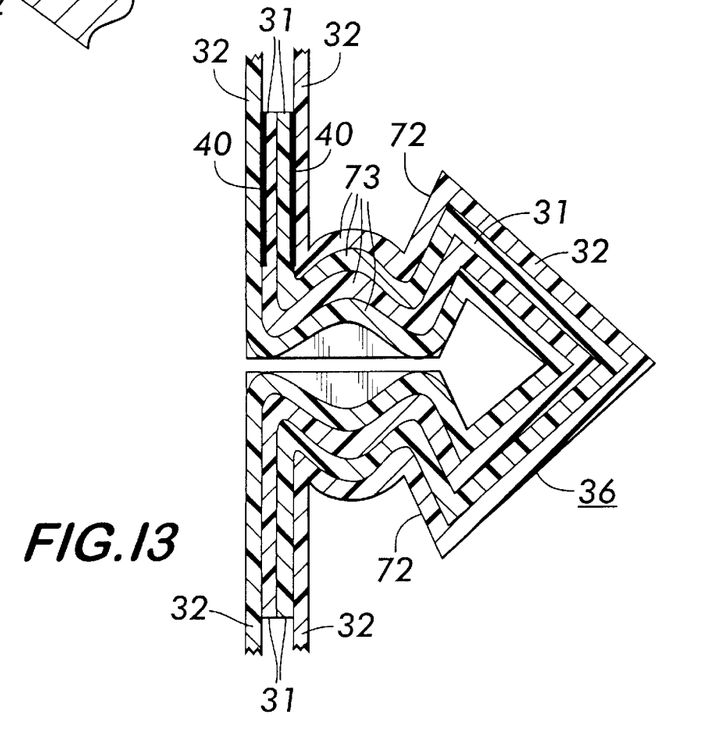
FIG. 13 is an enlarged cross section through the reclosable seal and the snap detents which are formed between the teeth of the forming dies, as would be seen when viewed along line 13—13 on FIG. 10.

FIGS. 10 through 13 show in greater detail the detent forming toothed dies 66 and the structure of the reclosable seal 36. FIG. 10 shows more clearly the relationship between the dies and the reclosable seal, and shows the shorter die teeth 76 in the central region of the die corresponding to the region of the overlap longitudinal package seal 26 formed by the film margin 47, as best shown in FIG. 11. FIG. 11 also shows more clearly the snap detents 73 which are formed in the seal male part 36A and female part 36B by an outward bulging of the thermoformable material between adjacent teeth 71 of the dies 66 when the dies close. The heat softened material between the apposed die teeth is compressed and can only move laterally, but such movement causes the outward bulging of the material which forms the detenits since material is moving from opposite sides into the same space between the adjacent die teeth and can not move inward. This is also shown in FIG. 12 in which the detents 73 are shown behind the die teeth 71. FIG. 13 is a section taken through the detents and shows the interfitted arrangement.

Figure 14:
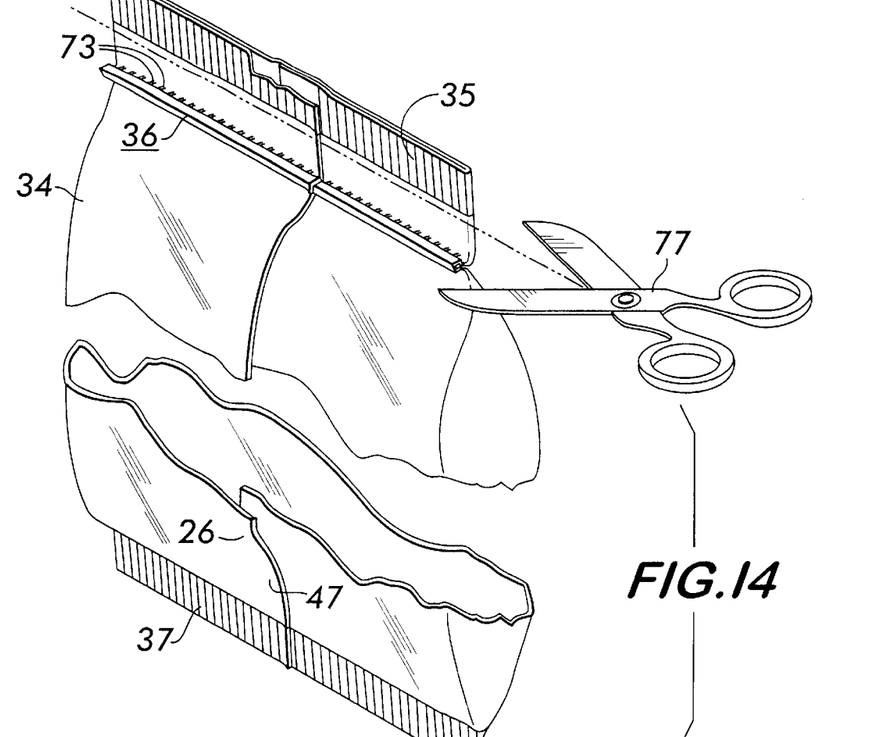
FIG. 14 is an isometric view of a package according to the invention showing showing the longitudinally extending overlap package seal uppermost, the package end seals, the integrally formed reclosable seal with the female portion uppermost and the seal side detent snaps.
Figure 15:
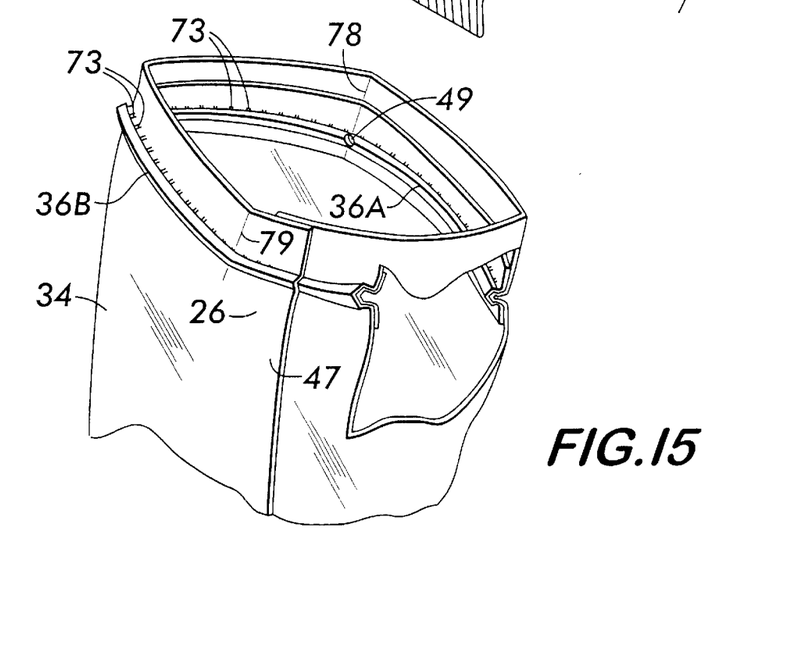
FIG. 15 shows the package of FIG. 14 with the top end seal removed and the package opened.

FIG. 14 shows a completed package about to be opened by cutting off the top heat seal 35 with scissors 77, and FIG. 15 shows the package with the top heat seal removed and pulled open, the bag remaining open because of the hinging folds 78 and 79. The hinge 78 results from the weakening produced by the strip 31 aperture 49 which is formed into the relatively rigid male part 36A of the reclosable seal 36, while the hinge 79 is formed at the abutment of the ends of the strip 31 located in the female part 36B. The package is simply closed by inward directed finger pressure on the outside of the hinges 78 and 79 which causes the package sides to snap to each other, and by then applying finger pressure to press the the male and female parts 36A and 36B together so that the snap detents interlock.

Figures 16, 17, 18:
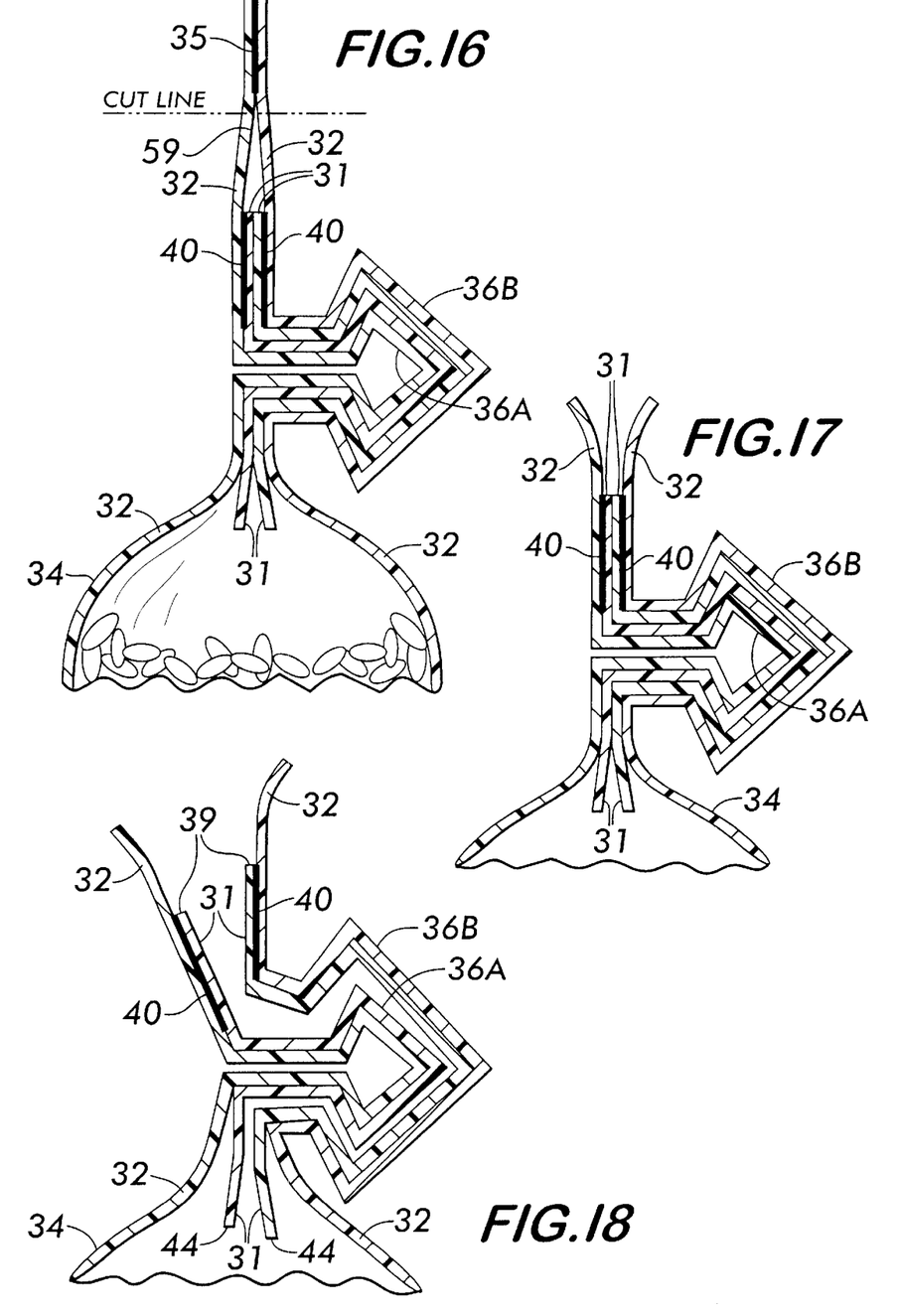
FIG. 16 is is an enlarged cross sectional diagrammatic showing of the upper end of a package including the novel reclosable interlocking seal according to the invention in its closed condition, and the package top heat seal spaced above the reclosable seal with an intervening length of unsecured package film.
FIG. 17 is an enlarged cross sectional diagrammatic showing of the novel reclosable interlocking seal according to the invention in its closed cotton with the package top heat seal shown in FIG. 16 removed by cutting through the intervening length of unsecured package film.
FIG. 18 is an enlarged cross sectional diagrammatic showing of the novel reclosable interlocking seal according to the invention similar to FIG. 17 but with the reclosable seal partly pulled open from the top.

FIGS. 16 to 18 show the upper end of a package 34 in enlarged diagrammatic cross section to illustrate the opening of the package. As shown in FIG. 16, the top seal is removed by cutting below it to provide the free top tabs of packaging film 32 shown in FIGS. 17 and 18. These top tabs are pulled away from each other as shown in FIG. 18 to open the female part 36B of the reclosable sealand disengage it from the inner male part 36A. The opening leverage is materially increased because the strip 31 is sealed to the film 32 by the trailing edge heat seal 40 and the opening pull is transmitted through the strip 31. Conversely, inadvertent opening of the package from the body side of the package is discriminated against because the strip 31 is unsecured to the package film 32 at its leading edge 44 inside the package and there is no reinforcement of pull on the film by the strip.

Having now described the invention in connection with particularly illustrated embodiments thereof, it will be understood that modifications and variations of the invention may now occur from time to time to those normally skilled in the art without departing from the essential scope or spirit of the invention, and accordingly it is intended to claim the invention both broadly and specifically as indicated in the appended claims.

What is claimed:

1. Apparatus for making a package having a reclosable interlocking seal including interfitting male and female parts and snap detents and end seals at opposite ends of the package, comprising in combination,
  a) means for transporting in lengthwise direction a web of flexible packaging material of selected width and indeterminate length having thermoformable strips of a length substantially greater than the strip width, said strips being affixed to the web with the strip length oriented transversely to the running length of the film at package length intervals,
  b) a pair of spaced apart heated male and female dies for partly forming the inner and outer separable portions of the reclosable interlocking seal with the inner portion fitted within the outer portion,
  c) a forming collar and means for moving the film over said forming collar and around a cylindrical forming tube and forming a longitudinally sealed cylindrical tube of packaging film with the thermoformable strip inside the film tube in substantially ends-abutting relationship, and with the surface of the strip not secured to the film in facing relationship within the tube, said film moving means moving the portion of the tube within which the strip is disposed into position between said pair of spaced apart heated male and female dies,
  d) male and female dies moving means effective when actuated in a first way for moving said male and female dies toward one another to press the face of the strip not secured to the film against itself to form two apposed strip faces extending entirely across the film tube, and effective for continuing to move said dies toward one another into mating position and forming the central part of the strip extending across the film tube into a recess of said female die to form a tip of an arrowhead shape of the reclosable interlocking seal, said male and female dies moving means when actuated in a second way being effective to partially retract said male die and being effective when actuated in a third way to fully retract said male and female dies to their initial positions,
  e) a pair of spaced apart interlocking seal completing heated dies disposed at opposite sides of said female die and having open and closed positions, said interlocking seal completing dies being effective when closed to press portions of the margins of the strip immediately adjacent to the central part of the strip inward against one another to form an inturned base of the arrowhead shape in the inner and outer portions of the reclosable interlocking seal and hold the seal within the female die and said interlocking seal completing dies being effective when opened to release the formed seal from the said female die, and
  f) operating means actuatable for moving said interlocking seal completing heated dies between said open and closed positions.

2. Apparatus as set forth in claim 1 further including package sealing and severing means for sealing and severing from one another adjacent ends of successive packages.

3. Apparatus as set forth in claim 1 wherein when said male and female dies are being retracted to their fully retracted initial positions, said interlocking seal completing dies remain in their closed position so that the package reclosable interlocking seal is held within said female die and the package is carried laterally outward with the retracting female die.

4. Apparatus as set forth in claim 1 wherein when said male and female dies are being retracted to their initial positions said interlocking seal completing dies remain in their closed position so that the package reclosable interlocking seal is held within said female die and the package is carried laterally outward with said retracting female die, said interlocking seal completing dies operating means being actuable to open said interlocking seal completing dies after said female die has been fully retracted.

5. Apparatus as set forth in claim 1, wherein said interlocking seal completing dies operating means are actuatable to open said interlocking seal completing dies after said female die has been fully retracted.

6. Apparatus as set forth in claim 1 further including package sealing and severing means for sealing and severing from one another adjacent ends of successive packages said operating means being actuated to form an adjacent ends of successive packages have been severed and said female die has been fully retracted.

7. Apparatus as set forth in claim 1 wherein said apparatus is a vertical form, fill and seal packaging machine, and said forming collar is inclined toward said cylindrical forming tube at an angle of substantially fifteen degrees above the horizontal with the low end of the collar proximate to said tube.

8. Apparatus as set forth in claim 1 wherein said apparatus is a vertical form, fill and seal packaging machine and said forming collar is inclined toward said cylindrical forming tube within an angular range of horizontal to about forty five degrees above the horizontal, with the low end of the collar proximate to said tube.

9. Apparatus as set forth in claim 1 wherein said pair of spaced apart interlocking seal completing heated dies disposed in open position at opposite sides of the female die are operative when closed to press portions of the margins of the strip immediately adjacent to the central part of the strip inward against one another to move said interlocking seal completing dies to said open position after said an inturned base of the arrowhead shape in the inner and outer portions of the reclosable interlocking seal held within the female die, and are operative to form detents in the portions of the margins of the strip next remote from the inturned base of the arrowhead shape of the reclosable interlocking seal said interlocking seal completing dies having row of apposed spaced teeth which when brought together force thermoformable strip material outward between the teeth to form said detents.

10. Apparatus for making a reclosable interlocking seal having a female outer part, a male inner part and snap detents, for a resealable package having front and back faces, the package being formed from a longitudinally sealed cylindrical tube of packaging film with a thermoformable strip secured to the film inside the tube in substantially ends-abutting relationship, and with the surface of the strip not secured to the film in facing relationship within the tube, comprising, a) a pair of spaced apart heated male and female dies, b) means for moving the portion of the tube within which the strip is disposed between said pair of spaced apart heated male and female dies, c) means effective when actuated in a first way for moving said male and female dies toward one another to press the face of the strip not secured to the film against itself to form two apposed strip faces extending entirely across the film tube, and effective for continuing to move said dies toward one another into mating position to form the central part of the strip extending across the film tube into a recess of said female die to form the tip of an arrowhead shaped reclosable seal, said means for moving said male and female dies toward one another also being operative when actuated in a second way to move said male and female dies away from one another, d) a pair of interlock seal completing heated dies positioned at opposite sides of the female die and having open and closed positions, e) means for moving toward one another into closed position said pair of interlock seal completing heated dies positioned at opposite sides of said female die to press portions of the margins of the strip immediately adjacent to the central part of the strip inward against one another effective to form an inturned base of the arrowhead shape to complete the inner male and outer female parts of the reclosable interlocking seal held between said female die and said pair of interlock seal completing heated dies.

11. Apparatus for making a reclosable interlocking seal as set forth in claim 10 wherein said pair of spaced apart Interlock seal completing heated dies disposed in open position at opposite sides of the female die are operative when closed to press portions of the margins of the strip immediately adjacent to the central part of the strip inward against one another to form the inturned base of the arrowhead shape in the inner and outer portions of the reclosable interlocking seal held within the female die.

12. Apparatus for making a reclosable interlocking seal as set forth in claim 10 wherein said pair of spaced apart interlock seal completing heated dies disposed in open position at opposite sides of the female die are operative when closed to press portions of the margins of the strip immediately adjacent to the central part of the strip inward against one another to form the inturned base of the arrowhead shape in the inner and outer portions of the reclosable interlocking seal held within the female die, and operative to form detents In the portions of the margins of the strip next remote from the inturned base of the arrowhead shaped reclosable seal.

13. Apparatus for making a reclosable interlocking seal as set forth in claim 10 wherein said pair of spaced apart interlock seal completing heated dies disposed in open position at opposite sides of the female die are operative when closed to press portions of the margins of the strip immediately adjacent to the central part of the strip inward against one another to form the inturned base of the arrowhead shape in the inner and outer portions of the reclosable interlocking seal held within the female die, and operative to form detents In the portions of the margins of the strip next remote from the inturned base of the arrowhead shaped reclosable seal said interlock seal completing dies having rows of apposed spaced teeth which when brought together force thermoformable strip material outward between the teeth to form said detents.

* * * * *